United States Patent
Nagin et al.

(10) Patent No.: US 7,428,658 B2
(45) Date of Patent: Sep. 23, 2008

(54) CHECKING STORAGE RECONFIGURATION

(75) Inventors: Kenneth Nagin, Natzrat Ilit (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 10/973,310

(22) Filed: Oct. 26, 2004

(65) Prior Publication Data

US 2006/0107102 A1    May 18, 2006

(51) Int. Cl.
   *G06F 11/00* (2006.01)
(52) U.S. Cl. .............................. 714/7; 714/42; 714/47; 711/114
(58) Field of Classification Search ............ 714/7, 714/42, 43, 47, 8, 29, 33; 711/114, 170
   See application file for complete search history.

(56) References Cited

U.S. PATENT DOCUMENTS

| | | | |
|---|---|---|---|
| 5,220,654 A | 6/1993 | Benson et al. | |
| 5,515,499 A | 5/1996 | Allen et al. | |
| 5,574,851 A | 11/1996 | Rathunde | |
| 5,835,953 A | 11/1998 | Ohran | |
| 6,032,194 A * | 2/2000 | Gai et al. | 709/239 |
| 6,088,766 A | 7/2000 | Bachmat et al. | |
| 6,209,059 B1 | 3/2001 | Ofer et al. | |
| 6,237,000 B1 | 5/2001 | Dahlen et al. | |
| 6,415,372 B1 | 7/2002 | Zakai et al. | |
| 6,421,723 B1 * | 7/2002 | Tawil | 709/224 |
| 6,496,850 B1 | 12/2002 | Bowman-Amuah | |
| 6,546,457 B1 | 4/2003 | Don et al. | |
| 6,751,683 B1 | 6/2004 | Johnson et al. | |
| 7,069,468 B1 * | 6/2006 | Olson et al. | 714/7 |
| 2002/0180795 A1 * | 12/2002 | Wright | 345/772 |
| 2003/0093619 A1 * | 5/2003 | Sugino et al. | 711/114 |
| 2004/0228290 A1 * | 11/2004 | Graves | 370/257 |
| 2005/0262233 A1 * | 11/2005 | Alon et al. | 709/223 |
| 2005/0268043 A1 * | 12/2005 | Kitamura | 711/131 |
| 2005/0268148 A1 * | 12/2005 | Matsubara et al. | 714/2 |
| 2005/0283655 A1 * | 12/2005 | Ashmore | 714/7 |

* cited by examiner

*Primary Examiner*—Robert W Beausoliel, Jr.
*Assistant Examiner*—Joseph D Manoskey

(57) ABSTRACT

A method for reconfiguring a storage system communicating with a host, consisting of the steps of formulating a proposed reconfiguration of the storage system from an original configuration, and generating a record of operations of the storage system during an evaluation period in the original configuration. In response to the record, the method further consists of making a determination whether data accessed by the host in the original configuration during the evaluation period would have been unavailable to the host if the proposed reconfiguration had been implemented prior to the evaluation period. In response to the determination, a decision is made whether to implement the proposed reconfiguration.

2 Claims, 4 Drawing Sheets

CHECKING STORAGE RECONFIGURATION

FIELD OF THE INVENTION

The present invention relates generally to safeguarding data, and specifically to safeguarding data stored in data storage systems.

BACKGROUND OF THE INVENTION

As data storage systems increase in size and complexity, their management becomes increasingly onerous. In addition to routine maintenance, which may includes alterations to the system such as installing, upgrading or removing software and hardware, there is the maintenance required to deal with emergencies, such as a failure of a part of the system. A number of processes are available to help administrators perform the system management.

U.S. Pat. No. 6,088,766 to Bachmat et al, whose disclosure is incorporated herein by reference, describes a process for load balancing of activities on storage devices by monitoring reading and writing to blocks of the devices. As described in the disclosure, statistics derived from such monitoring may be used to decide whether reallocation or exchange of a pair of physical volumes is made.

U.S. Pat. No. 6,496,850 to Bowman-Amuah, whose disclosure is incorporated herein by reference, describes a process for determining an "orphaned server context." The process maintains a list of contexts of outstanding server objects, and of clients interested in the contexts. The list is examined at predetermined times to determine if a context has been accessed by a client, and those that have not been accessed within the time are provided to the clients.

U.S. Pat. No. 6,415,372 to Zakai et al, whose disclosure is incorporated herein by reference, describes a system for reconfiguring a storage system, and for rolling back a configuration of a storage system to an earlier configuration. The disclosure states that rolling back configurations can help system managers who wish to experiment with different configurations. The disclosure further states that a system manager may make a tentative reconfiguration, and roll back to an earlier configuration if the new configuration does not improve performance.

U.S. Pat. No. 5,835,953 to Ohran, whose disclosure is incorporated herein by reference, describes a system that maintains logically consistent backups. A primary system identifies changes that are to be made in a mass storage device, and captures a static snapshot of locations where changes are to be made in the device when it is in a logically consistent state. The snapshot is used to facilitate the backup of data blocks to be changed.

U.S. Pat. No. 6,209,059 to Ofer et al, whose disclosure is incorporated herein by reference, describes a method for on-line reconfiguration of logical volumes of a storage system. A new configuration is defined by rearranging a request queue, and redefining devices of the system within the queue. The rearrangement and redefinition occur while the current configuration operates. The system may be operated in accordance with the new configuration once it is defined.

U.S. Pat. No. 6,237,000 to Dahlen et al, whose disclosure is incorporated herein by reference, describes a system for previewing results of a data structure allocation. A coupling facility receives a message containing parameters defining a data structure. The facility returns a message giving values of the data structure without actually allocating the data structure.

U.S. Pat. No. 3,702,006 to Page, whose disclosure is incorporated herein by reference, describes a method for balancing I/O devices. During operation of a processing system, a count is made of a number of times each I/O device of the system is accessed by each task of the system. An estimated current utilization and an anticipated utilization are compared so as to allocate data sets to a least used I/O device.

U.S. Pat. No. 5,515,499 to Allen et al, whose disclosure is incorporated herein by reference, describes a method for rebuilding a structure located in a data processing system. A connection is made to a first structure having one or more predefined characteristics. The first structure has a name. A second structure having the same name as the first structure is allocated. The second structure has one or more predefined characteristics different from the first structure. The disclosure states that the second structure may be used for planned system reconfigurations or for recovery from system failures.

U.S. Pat. No. 5,574,851 to Rathunde, whose disclosure is incorporated herein by reference, describes an architecture for on-line reconfiguration of a Redundant Array of Independent Disks (RAID). The architecture allows the reconfiguration to be performed in a sequential manner, while disk I/O operations continue.

U.S. Pat. No. 6,546,457 to Don et al, whose disclosure is incorporated herein by reference, describes a system for reconfiguring striped disks in a storage array. A copy of one of the devices in the array is made in parallel with host operations. A logical device with a new configuration is then substituted for access by the host.

U.S. Pat. No. 5,220,654 to Benson et al, whose disclosure is incorporated herein by reference, describes a serialization technique for changing an I/O configuration. The technique insures that data integrity is not lost on devices being reconfigured, and that changes to control structures are noticed by programs accessing the structures while the structures change.

SUMMARY OF THE INVENTION

Reconfiguring arrays of disks in a storage system may entail erasure of relatively large numbers of disks in the system, prior to rearranging the disks into a different configuration. Alternatively, reconfiguration may require de-allocation of storage prior to reallocation of the storage to other processes. Errors in these types of reconfigurations typically lead to irrecoverable data loss, and the inventors have found that a system administrator operating such a storage system is frequently reluctant to implement the reconfigurations without requesting help from the storage system installer. The provision of such help creates extra costs for both the operator and the installer.

In embodiments of the present invention, the system administrator formulates a proposed reconfiguration of the system from an originally configured state. Before implementing the reconfiguration, a record of operations of the system is made over the course of an evaluation period. The record is examined against the proposed reconfiguration in order to check whether data accessed during the evaluation period would have been erased or otherwise become inaccessible if the reconfiguration had actually been implemented (in which case the data access request would have failed). If no such failures are detected over a test period of sufficient length, the system administrator is able to determine, with high probability, that the proposed reconfiguration is safe. Simulating the proposed reconfiguration in this manner before actually implementing the reconfiguration aids the administrator in avoiding errors and thus allows the administrator to decide, without external help, when and how to reconfigure the system.

In one embodiment, the record of operations is generated by intercepting all the operations of the system in its originally configured state for a period of time that may be defined by the administrator. The record is compared with the proposed reconfiguration, and the resulting comparison enables the administrator to judge whether or not to implement the proposed reconfiguration.

Alternatively or additionally, the system is configured to maintain a history of operations performed on the system, typically as a continuing background task of the system during the normal course of system operation. The history comprises operations made before and/or after the administrator formulates the proposed reconfiguration. The history is used to generate the record of operations.

Typically, the system analyzes the record, compares the record with the proposed configuration, and notifies the administrator of the results of the comparison. The administrator may then implement or abort the proposed reconfiguration on the basis of the notification, or may perform additional checks, optionally on a modification of the proposed reconfiguration.

There is therefore provided, according to an embodiment of the present invention, a method for reconfiguring a storage system communicating with a host, including:

formulating a proposed reconfiguration of the storage system from an original configuration;

generating a record of operations of the storage system during an evaluation period in the original configuration;

in response to the record, making a determination whether data accessed by the host in the original configuration during the evaluation period would have been unavailable to the host if the proposed reconfiguration had been implemented prior to the evaluation period; and in response to the determination, deciding whether to implement the proposed reconfiguration.

In a disclosed embodiment the storage system is included in at least one of a network attached storage (NAS) system, and a storage area network (SAN).

Typically, making the determination includes providing a notification that the data would have been unavailable to an administrator of the storage system.

In one embodiment the storage system includes a stable storage medium, and the proposed reconfiguration includes at least one of a physical alteration to the medium and a logical alteration to the medium.

In an alternative embodiment the storage system includes a volatile memory, and the proposed reconfiguration includes at least one of a physical alteration to the memory and a logical alteration to the memory.

Typically, generating the record of operations includes selecting operations to be recorded in response to the proposed reconfiguration, and intercepting the selected operations. Intercepting the selected operations may include constructing a data structure to track the selected operations.

In a further alternative embodiment generating the record of operations includes maintaining a history of the operations prior to formulating the proposed reconfiguration, and making the determination includes analyzing the history to determine if the data accessed by the host would have been unavailable.

Deciding whether to implement the proposed reconfiguration may include implementing the proposed reconfiguration in a single atomic operation.

There is further provided, according to an embodiment of the present invention, apparatus for reconfiguring a storage system communicating with a host, including:

a processing unit which is adapted to:

receive a formulation of a proposed reconfiguration of the storage system from an original configuration, generate a record of operations of the storage system during an evaluation period in the original configuration, in response to the record, make a determination whether data accessed by the host in the original configuration during the evaluation period would have been unavailable to the host if the proposed reconfiguration had been implemented prior to the evaluation period, and in response to the determination, generate a recommendation whether to implement the proposed reconfiguration.

Typically, the storage system is included in at least one of a network attached storage (NAS) system, and a storage area network (SAN).

In a disclosed embodiment generating the recommendation includes providing a notification that the data would have been unavailable to an administrator of the storage system.

In one embodiment the apparatus includes a stable storage medium, wherein the proposed reconfiguration includes at least one of a physical alteration to the medium and a logical alteration to the medium.

Alternatively or additionally the apparatus includes a volatile memory, wherein the proposed reconfiguration includes at least one of a physical alteration to the memory and a logical alteration to the memory.

Typically, generating the record of operations includes selecting operations to be recorded in response to the proposed reconfiguration, and intercepting the selected operations. Intercepting the selected operations may include constructing a data structure to track the selected operations.

In an alternative embodiment of the apparatus generating the record of operations includes maintaining a history of the operations prior to formulating the proposed reconfiguration, and making the determination includes analyzing the history to determine if the data accessed by the host would have been unavailable.

Typically, the processing unit is adapted to implement the proposed reconfiguration in a single atomic operation.

There is further provided, according to an embodiment of the present invention, a computer software product for reconfiguring a storage system communicating with a host, the product including a computer-readable medium having computer program instructions recorded therein, which instructions, when read by a computer, cause the computer to:

receive a proposed reconfiguration of the storage system from an original configuration;

generate a record of operations of the storage system during an evaluation period in the original configuration;

in response to the record, make a determination whether data accessed by the host in the original configuration during the evaluation period would have been unavailable to the host if the proposed reconfiguration had been implemented prior to the evaluation period; and in response to the determination, recommend whether to implement the proposed reconfiguration.

The present invention will be more fully understood from the following detailed description of the preferred embodiments thereof, taken together with the drawings, a brief description of which follows.

DETAILED DESCRIPTION OF EMBODIMENTS

Figure 1:
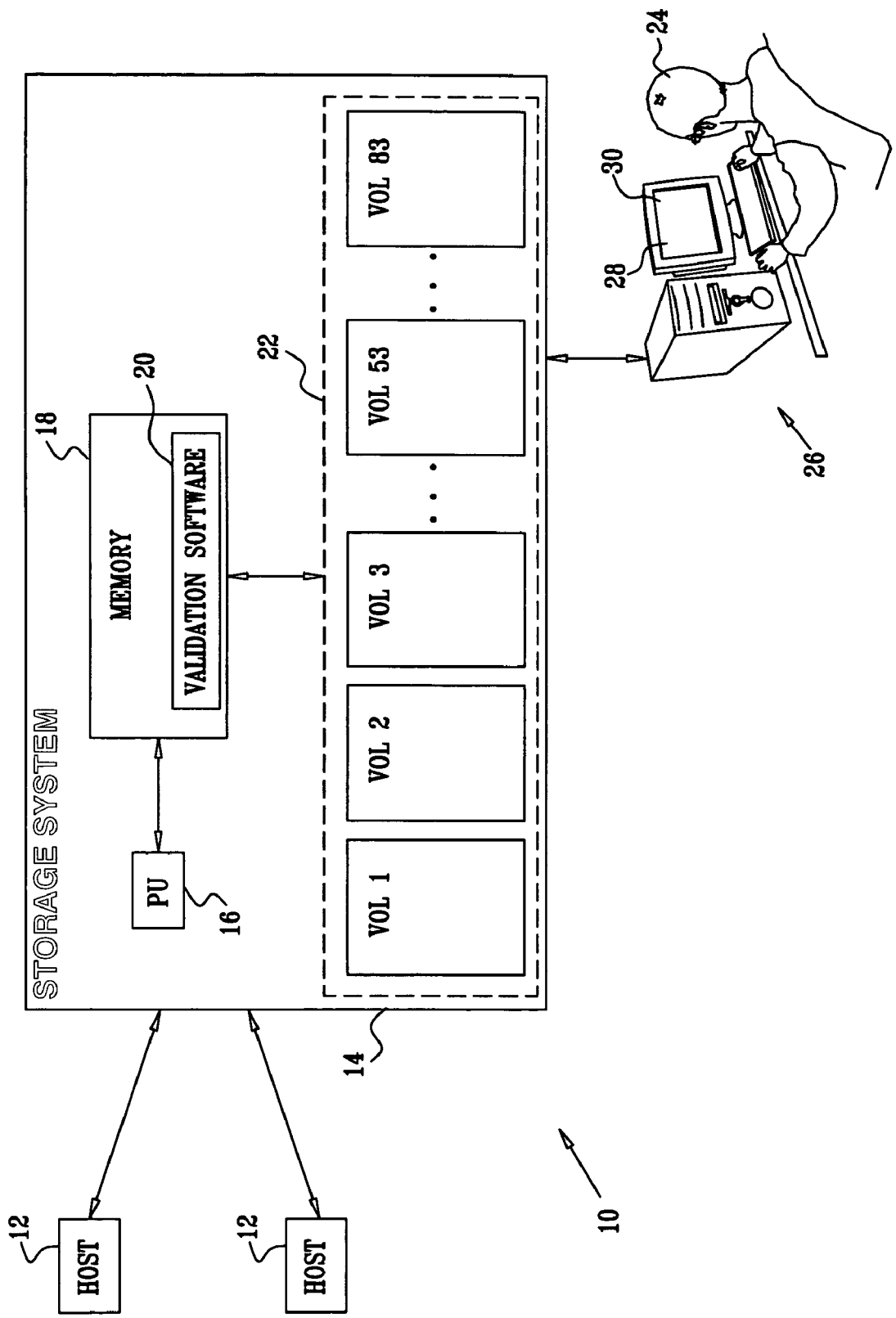
FIG. 1 is a schematic block diagram of a data storage system, according to an embodiment of the present invention.

Reference is now made to FIG. 1, which is a schematic block diagram of a data storage facility 10, according to an embodiment of the present invention. Facility 10 comprises a storage system 14, which is typically implemented as a network attached storage (NAS) system, or as a storage area network (SAN), although it will be appreciated that system 14 may comprise other types of data storage. One or more hosts 12 communicate with system 14, typically for the purpose of reading data from, or writing data to, the system. System 14 is operated and maintained by a system administrator 24 via a computer 26 which is coupled to the system. The computer comprises a screen 28 on which a graphic user interface (GUI) 30 is displayed, GUI 30 facilitating the administrator's operation of system 14. It will be understood that use of the GUI to operate the system is as an example, and that system 14 may be operated and maintained without a GUI.

By way of example, system 14 is assumed to be controlled by a processing unit (PU) 16, interacting with a volatile memory 18. It will be appreciated that PU 16 may comprise more than one physical processor, and that memory 18 may comprise more than one physical memory, and that such processors and memories may be localized and/or distributed within system 14.

PU 16 controls a stable storage medium 22 wherein the data accessed by hosts 12 is permanently stored. By way of example, medium 22 is assumed to comprise one or more disks which are formatted into a configuration, hereinbelow also termed the original configuration, as a plurality of volumes VOL 1, VOL 2, VOL 3, . . . VOL 53, . . . VOL 83, . . . .

Memory 18 and/or medium 22 have written to them, inter alia, software 20 for checking proposed reconfigurations of system 14, as described hereinbelow. Software 20 may be provided to system 14 as a computer software product in a tangible form on a computer-readable medium such as a CD-ROM, or as an electronic data transmission, or as a mixture of both forms.

During operation of facility 10, administrator 24 proposes to reconfigure the original configuration of system 14 to a new configuration, hereinbelow also termed the proposed reconfiguration, which may comprise physical and/or logical alterations to one or more elements of the system. Typically, the proposed reconfiguration may comprise erasure of some data stored in medium 22, and depending on the type of erasure, the data erased may or may not be recoverable. As described with reference to FIGS. 2-4, the administrator uses software 20 to validate that the proposed reconfiguration will not lead to a configuration that makes data expected to be available to one of hosts 12 unavailable and/or irretrievable. Hereinbelow, by way of example, the proposed reconfiguration is assumed to comprise erasing data on medium 22 by re-formatting VOL 53, so that data stored therein in the original configuration becomes irretrievable.

Figure 2:
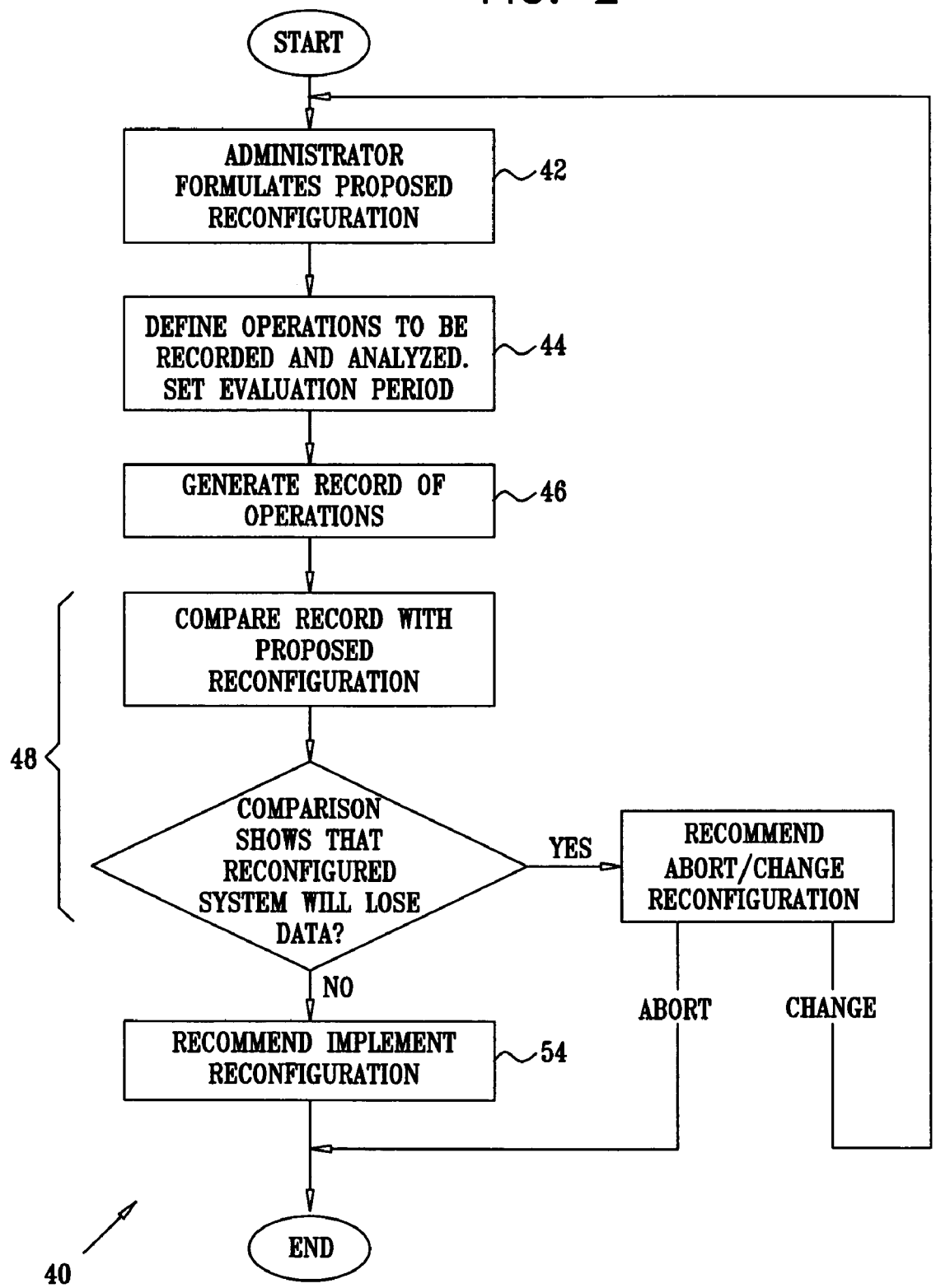
FIG. 2 is a flowchart showing steps for a first validation process of a proposed reconfiguration of the data storage system, according to an embodiment of the present invention.

FIG. 2 is a flowchart showing steps followed for a first validation process 40 of the proposed reconfiguration, according to an embodiment of the present invention. In a formulation step 42, the administrator formulates the proposed reconfiguration. The proposed reconfiguration is saved in memory 18 and/or in stable storage medium 22.

In a definition step 44, administrator 24 defines operations of system 14 that are to be recorded and analyzed by software 20, before implementation of the new configuration. Since VOL 53 is to be re-formatted, a typical set of operations defined by the administrator comprise read and write operations from locations in VOL 53, and the respective times of the operations. Definition step 44 also comprises an evaluation period, set by the administrator, over which the defined operations are to be recorded. Process 40 helps the administrator to decide if data accessed by one of hosts 12 would have been unavailable to the host if the proposed reconfiguration had been implemented prior to the evaluation period.

In a recording step 46, PU 16 uses software 20 to generate a record of operations defined in step 44, and the recording is carried out for the period set. The record is generated by intercepting all operations to VOL 53.

In an analysis step 48, PU 16 uses software 20 to compare the record of operations with the proposed reconfiguration, and to decide, based on the comparison, a next step in the validation process. If the comparison shows that the proposed reconfiguration leads to a loss of needed data, then PU 16 performs an abort/change reconfiguration step 52. If the comparison shows that there is no loss of needed data, then an implementation step 54 is the next step of the validation process.

For example, the record may show that there is a read operation from a specific location in VOL 53 by one of hosts 12 before any of the hosts, or any other entity in system 14, has written to that location. Such a sequence shows that implementing the proposed reconfiguration leads to an irretrievable loss of data stored in VOL 53. In this case software 20 continues to a step 52. If there is no such sequence, then software 20 continues to a step 54. It will be appreciated that in many cases it is sufficient for the record to show that VOL 53 has been used, without tracking an order of read and write operations.

In step 52, PU 16 alerts administrator 24 that implementing the proposed reconfiguration leads to an irretrievable data loss. Typically the alert comprises an alert message displayed on GUI 28 giving details of results of the operations defined in definition step 44. An example of a typical alert on GUI 30 is given in FIG. 3. In an embodiment, the message also includes a statement to the effect that implementing the proposed reconfiguration leads to an irretrievable loss of data, and the message may further include an identity of a specific host 12 requesting the data. Typically, the message further includes a recommendation to the administrator that the new configuration is to be aborted and/or changed.

Process 40 then ends if the administrator aborts the new configuration, or returns to the beginning of step 42 if the configuration is to be changed.

In step 54, PU 16 notifies the administrator that the proposed reconfiguration does not appear to result in irretrievable loss of data, and/or that there is a high probability that there is no irretrievable data loss. The notification typically also comprises a notification message on GUI 30 giving details of the results of the operations defined in definition step 44. In one embodiment of the present invention, software 20 is configured to enable administrator 24 to implement the proposed reconfiguration, stored in step 42 in memory 18, as a single atomic operation. It will be understood that such an atomic operation assures the administrator that it is the already validated reconfiguration that will be implemented, and no other, and that the system itself checks that the complete reconfiguration is made.

It will be appreciated that the operations given above for step 44 are provided purely by way of example, and those skilled in the art will be able to generate other operations that check if the proposed reconfiguration will lead to an irretrievable loss of data from system 14, or to data stored therein becoming unavailable to one of the hosts communicating with the system. All such operations are assumed to be comprised within the scope of the present invention. It will also be appreciated that implementation of flowchart 40 may include construction of data structures used to track the operations, such as a bitmap which records if a block in VOL 53 has been written to before a read request is made to the block. All such data structures are also assumed to be comprised within the scope of the present invention.

It will also be appreciated that validation process 40 is extremely flexible, since it allows the administrator to both formulate the proposed reconfiguration and, if necessary, to define one or more data structures for use in checking it.

Figure 3:
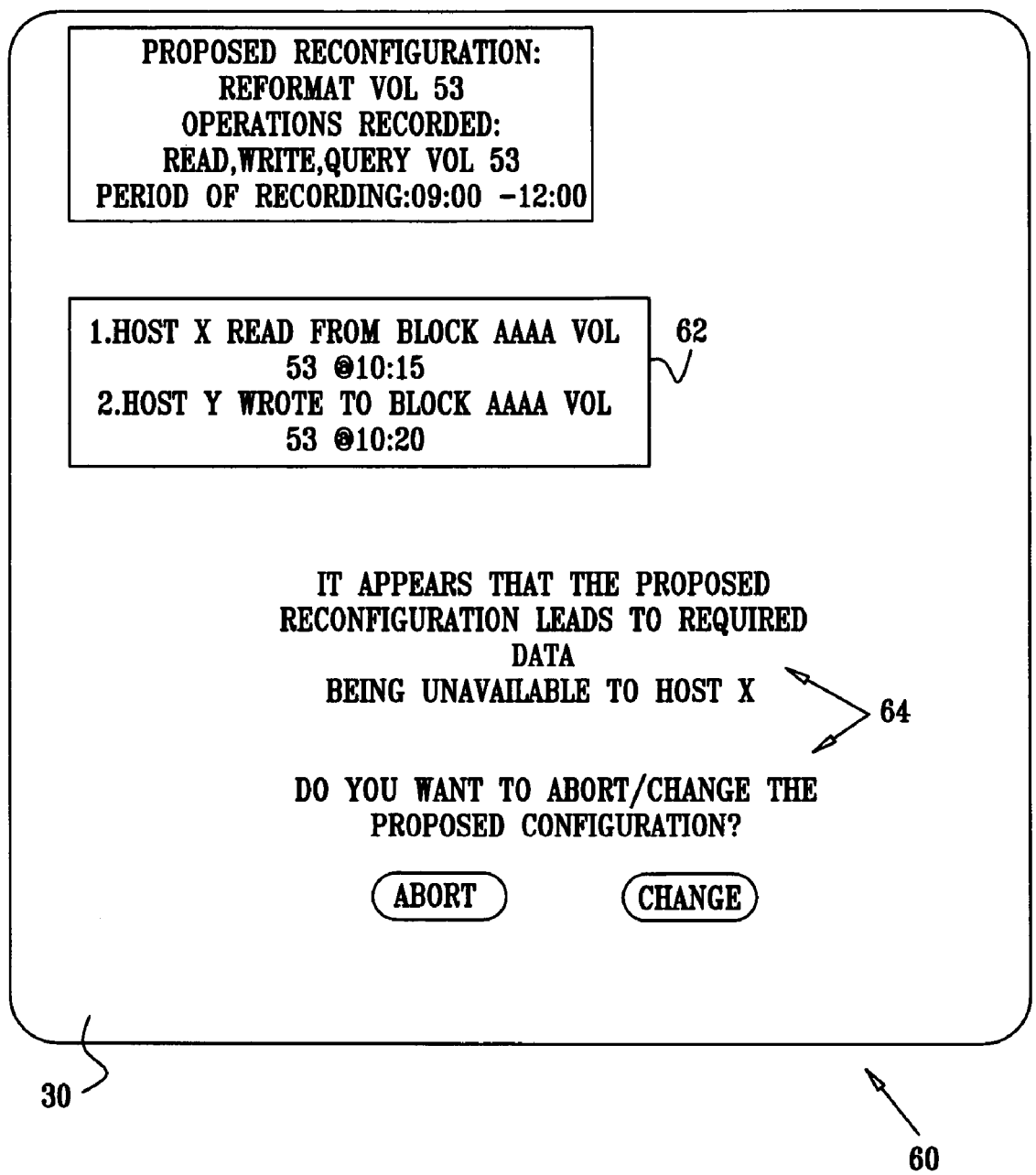
FIG. 3 is an example of an alert generated by the first validation process, according to an embodiment of the present invention.

FIG. 3 is an example of an alert 60 generated by process 40 and displayed on GUI 30, according to an embodiment of the present invention. Alert 60 corresponds to an alert generated if process 40 has determined that the proposed configuration would lead to data becoming unavailable to a specific host who requests the data. Alert 60 comprises a results section 62, and a conclusion section 64. It will be appreciated that the content of alerts such as alert 60 is dependent on the proposed reconfiguration formulated by the system administrator.

Figure 4:
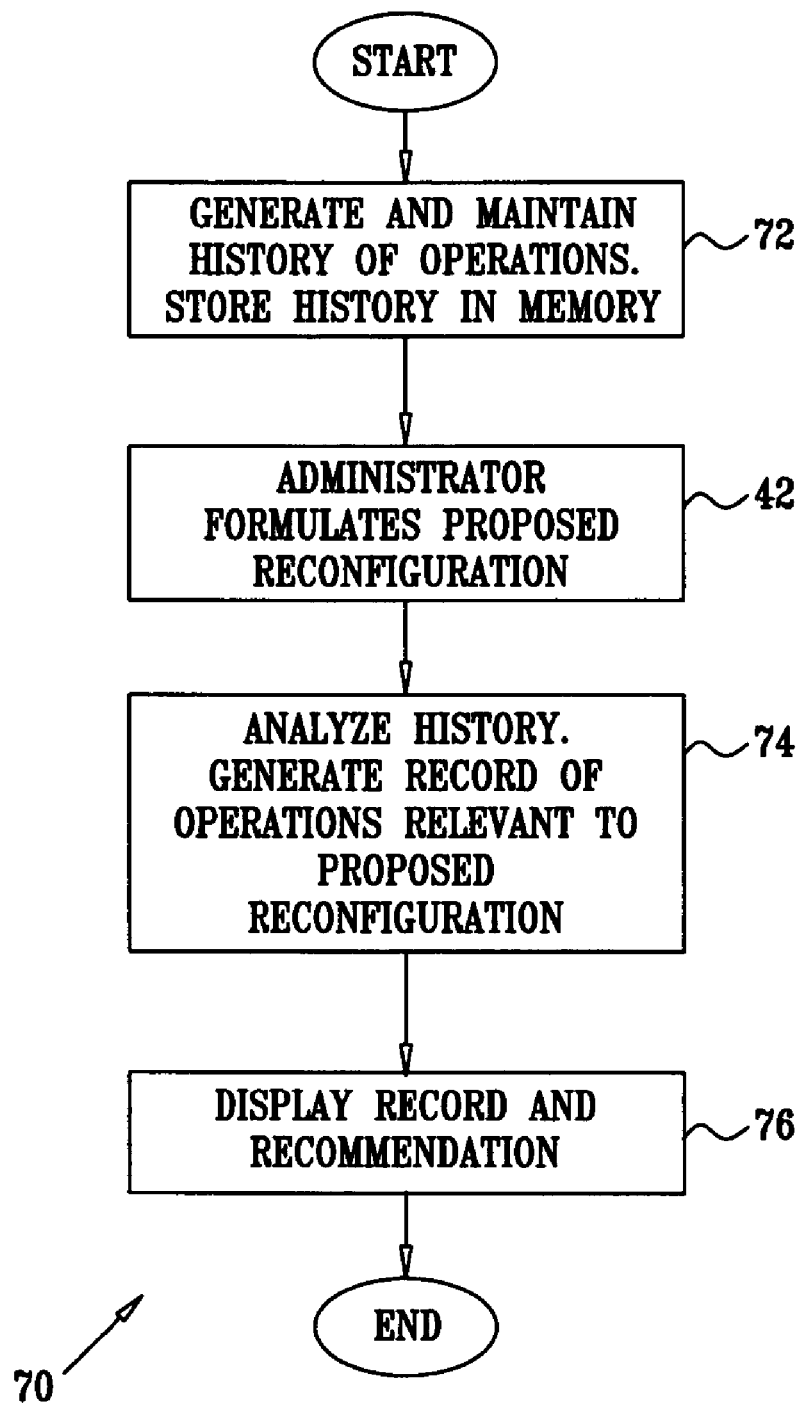
FIG. 4 is a flowchart showing steps for a second validation process of the proposed reconfiguration, according to an embodiment of the present invention.

FIG. 4 is a flowchart showing steps followed for a second validation process 70 of the proposed reconfiguration, according to an embodiment of the present invention. Apart from the differences described below, the steps of process 70 are generally similar to those of process 40 (FIG. 2), such that steps indicated by the same reference numerals in both flowcharts are generally implemented in a similar manner. In an initial step 72 of process 70, it is assumed that PU 16 maintains a history of operations performed on medium 22. The history is typically maintained for some retrospective period, determined by the administrator, corresponding to the evaluation period of process 40. PU 16 stores the history in memory 18. Typically, the history of operations comprises a log for each logical unit of medium 22, the log comprising a record of each possible operation, such as read, write, and query, that may be performed on the logical unit, as well as a last time that the operation was performed. Optionally, the history may comprise more than one time of performance of each type of possible operation. In one embodiment of the present invention, the history only comprises a last time that an operation was performed on the entity or entities being checked.

Formulation step 42 is substantially as described above for process 40.

In an analysis step 74, PU 16 analyzes the history, and generates a record of operations comprising operations that are relevant to the proposed reconfiguration. Typically, the record of operations comprises the operations performed on VOL 53, the one or more times of such operations, and identities of the hosts 12 performing the operations.

In a display step 76, PU 16 displays the record of operations on GUI 30, together with a recommendation based on the results. The displayed record is generally similar in form to alert 60 (FIG. 3), having a results section 62, and a conclusion section 64 comprising the recommendation.

The displayed record shows if data accessed by one of hosts 12 would have been unavailable to the host if the proposed reconfiguration had been implemented. It will thus be appreciated that the displayed record of relevant past operations of system 14 will aid administrator 24 in deciding whether or not to implement the proposed reconfiguration. For example, the displayed record may comprise a statement that the last time a specific location in VOL 53 was read from by a specific host 12 was less than an hour before process 70 was begun. In this case there is a high probability that implementation of the proposed reconfiguration would lead to irretrievable loss of data, and the recommendation displayed in section 64 reflects this high probability.

The administrator may perform validation process 70, or variations thereof, in a number of different embodiments. For example, in a first embodiment, administrator 24 uses process 70 in an iterative manner, by making an initial formulation of a proposed reconfiguration in step 42, reviewing the displayed record of operations produced in step 76, reformulating the configuration, and reviewing the displayed for the reformulated configuration. In the example above, where the displayed record gives a high likelihood that re-formatting of VOL 53 would be an error, the administrator may realize that the proposed reconfiguration should have been to re-format VOL 83; the administrator is able to then check that this proposed reconfiguration will not lead to data loss.

In a second embodiment, the administrator varies process 70 by implementing step 72 after formulation step 42. In this case, the administrator formulates the proposed reconfiguration, and then PU 16 generates the history of operations. Typically, in formulating the proposed reconfiguration, the administrator also provides a time period over which PU 16 is to generate the history in step 72.

Other variations on process 70, as well as other embodiments where process 70 or variations thereof may be used will be apparent to those skilled in the art. All such variations and embodiments are assumed to be within the scope of the present invention.

While process 70 may not be as flexible as process 40, it will be understood that it is typically simpler in implementation and requires less input from administrator 24.

It will be appreciated that both process 40 and process 70, or variations thereof, may be applied by administrator 24 to validate a proposed reconfiguration. Such a dual application will typically provide the administrator with a higher degree of certainty that the proposed reconfiguration will not lead to data becoming unavailable, compared to applying one of the processes.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for reconfiguring a storage system communicating with a host, comprising:

formulating a proposed reconfiguration of the storage system from an original configuration;

generating a record of operations of the storage system during an evaluation period in the original configuration;

in response to the record, making a determination whether data accessed by the host in the original configuration during the evaluation period would have become irretrievably unavailable to the host if the proposed reconfiguration had been implemented prior to the evaluation period; and in response to the determination, deciding whether to implement the proposed reconfiguration, wherein generating the record of operations comprises selecting operations to be recorded in response to the proposed reconfiguration, and intercepting the selected operations.

2. The method according to claim 1, wherein intercepting the selected operations comprises constructing a data structure to track the selected operations.

* * * * *